Oct. 19, 1926.  
A. E. R. SCHNEIDER ET AL  
SELF UNLOADING VESSEL  
Filed Nov. 19, 1924
1,603,558
2 Sheets-Sheet 1
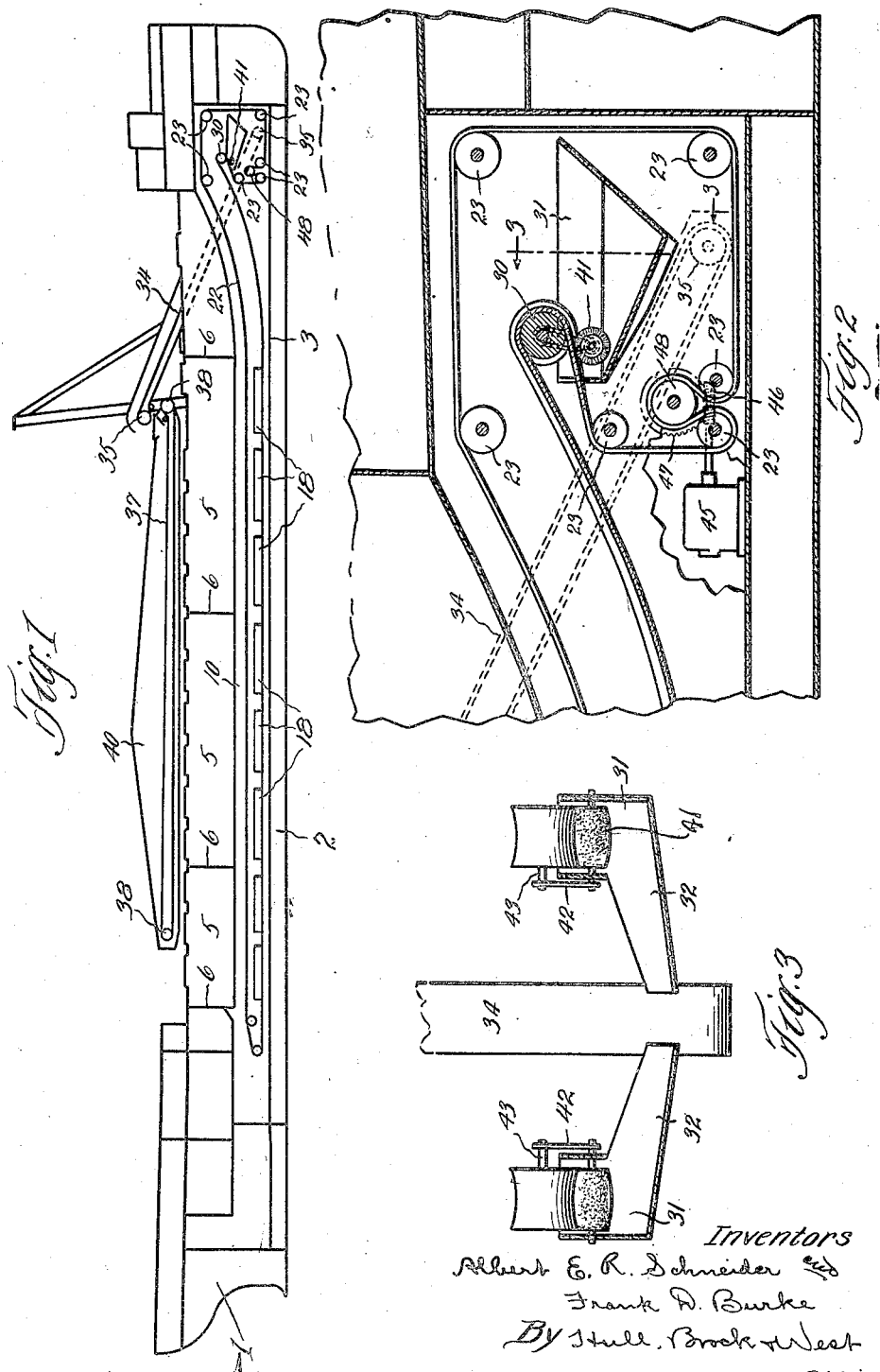

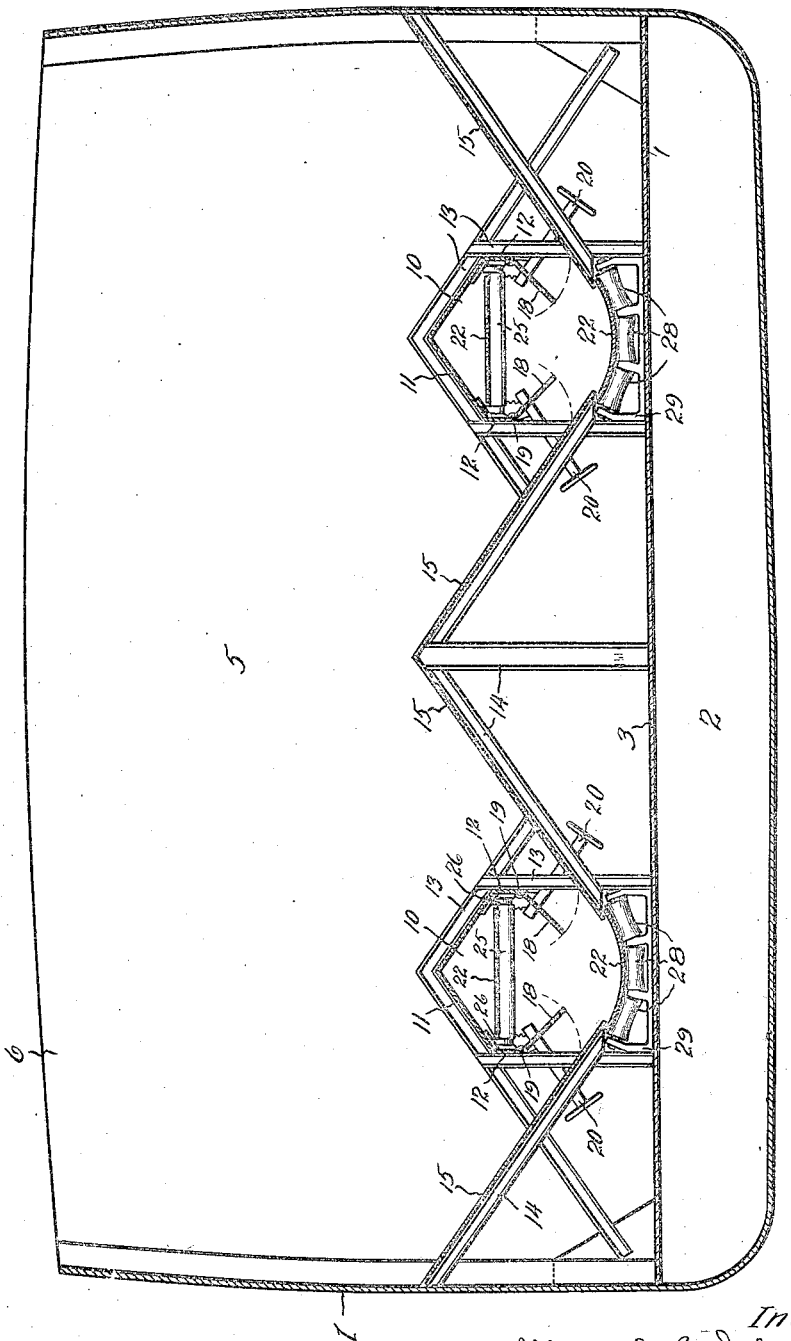

Patented Oct. 19, 1926.

1,603,558

UNITED STATES PATENT OFFICE.

ALBERT E. R. SCHNEIDER AND FRANK D. BURKE, OF LAKEWOOD, OHIO.

SELF-UNLOADING VESSEL.

Application filed November 19, 1924. Serial No. 750,743.

This invention relates to cargo carrying vessels of the class incorporating apparatus for unloading bulk cargo of subdivided material, such as grain, ore, crushed stone, coal, and the like, from the hold of the vessel.

Highly desirable in vessels of this class, and contributing in proportion to the degree of their attainment to the commercial success of the vessel, are:

First, as great a cargo capacity as possible with respect to the ship's dimensions;

Second, as low a center of gravity as practicable so as to minimize the roll of the vessel and thus increase its safety by reducing the liability of the cargo shifting during rough weather; and Third, speed in unloading.

The principal aim of our invention, therefore, is to provide a cargo carrying vessel possessing the foregoing qualities in the highest degree, and to this end we employ an endless belt or apron conveyor or conveyors arranged longitudinally of the vessel with the lower flight or flights as near the bottom of the vessel as practical, the conveyor or conveyors being enclosed in a tunnel or tunnels having side openings spaced apart longitudinally of the tunnel or tunnels and through which inclined cargo supporting floors extend in discharging relation to the lower flight or flights of the conveyor or conveyors, there being doors, equipped with suitable operating mechanisms, for controlling the flow of material through said openings.

The employment of a belt or apron conveyor enables us to acquire the speed desired in unloading, and the placing of the conveyor as near the bottom of the vessel as possible and the utilization of its lower flight as the cargo carrying or working flight requires a comparatively shallow tunnel for the accommodation of the conveyor and allows the cargo supporting floors to be placed much lower than would otherwise be possible. Consequently, by this arrangement, we accomplish the maximum carrying capacity and a low center of gravity.

Further objects of the invention are to provide an endless belt or apron conveyor that is supported by suitable guides or rollers and wherein the lower flight of the conveyor is used as the load carrier; and to associate with the conveyor a wiping means or brush for removing any material which adheres to the conveyor after it has discharged its load and before returning to guides or rollers wherewith the load carrying side of the conveyor engages.

The objects above set forth, with others which will appear as this description proceeds, are attained in the embodiment of the invention illustrated in the accompanying drawings wherein Fig. 1 is a diagrammatic representation, in the nature of a sectional side elevation, of a vessel equipped with our invention; Fig. 2 is an enlarged sectional detail of the discharge end of one of the conveyors showing the driving mechanism and other associated parts; Fig. 3 is a sectional detail on the line 3—3 of Fig. 2; and Fig. 4 represents a transverse section through the vessel.

The hull of the vessel is designated 1 and it is provided with the usual so-called "water bottom" 2 which is a water filled space between the bottom of the hull and a floor 3 that separates said space from the hold of the vessel. Amidship, the hold is divided into cargo compartments 5 by partitions 6.

Extending longitudinally of the vessel and through the lower portions of the compartments 5 are comparatively shallow tunnels 10 having ridge roofs 11 and side walls 12 that are supported by suitable structural elements or beams 13. Similar structural elements 14 sustain cargo supporting floors 15 on opposite sides of each of the tunnels 10, said floors being inclined and shown as having their lower ends extending into the tunnels 10. The angle of inclination of the cargo supporting floors 15 is no steeper than that required to insure a flow of material downwardly along the floors into the tunnels, it being an object, as hereinbefore stated, to keep these floors, with the tunnels, as low as practicable so as to increase the capacity of the cargo compartments and at the same time lower the center of gravity of the vessel.

It will be observed that the lower edges of the side walls 12 of the tunnels are spaced from the cargo supporting floors 15. This is to provide openings through which the cargo material will flow into the tunnels, and these openings are equipped with doors 18 that are hinged at 19 adjacent the lower edges of the walls 12. Operating and holding mechanisms for these doors are shown conventionally at 20.

The tunnels 10 are enlarged at their forward ends, as shown in Figs. 1 and 2, and housed within each tunnel is an endless belt or apron conveyor designated 22. Suitable guides or rollers are provided in accordance with prevailing practice to support the conveyors 22 with their upper flights within the tops of the tunnels 10 and their lower flights adjacent the bottoms thereof. Guides or rollers are designated 23 in Figs. 1 and 2, and it will be understood that as many of such may be employed as the circumstances require. Also, suitable take-up means may be included, as in connection with the rearmost roller 23. In Fig. 4, rollers 25 are shown as supported by brackets 26 in a position to sustain the top flights of the conveyors 22 well up within the tunnels and immediately below the roof thereof and where they will not interfere in any way with the operation of the doors 18. The lower flight of each conveyor is supported at suitable points throughout its length by transverse series of rollers 28 that are rotatably sustained by brackets 29 disposed transversely of the tunnels 10 upon the floor 3. The rollers 28 are so arranged as to impart to the conveyor a transverse curvature or trough-like formation and to position it with its lateral edges below the discharge ends of the cargo supporting floors 15.

Within the enlarged forward end of its respective tunnel, the lower flight of each conveyor is passed about a roller 30 and brought back beneath itself to the adjacent guide roller 23 and, in receiving relation to that portion of the conveyor which passes about the roller 30, is a hopper 31 having a lateral discharge spout 32. The spouts of the hoppers 31 which are associated with the opposed conveyors are directed toward each other, as shown in Fig. 3, where their delivery ends are shown as supported in operative relation to a belt or apron conveyor 34 that is supported by guides or rollers 35 within a central compartment of the vessel and is inclined upwardly and rearwardly so that it, in turn, may discharge material upon a conveyor 37 guided over rollers 38 or the like that are carried by a swinging boom 40. The outer or discharge end of the boom—the end opposite the conveyor 34—is adapted to be swung about in a horizontal plane and adjusted vertically by suitable rigging (not shown).

Since it is the inner sides of the conveyors 22 which carry the cargo material and also engage the guide rollers 23, it is deemed advisable to provide means for cleaning said sides of adhering material before they return to the guide rollers, and for this purpose we propose to employ rotary brushes 41, suitably supported within the hoppers 31 in contact with the conveyor. The brushes are shown as having driving connection, through belts 42 or the like, with the shafts 43 of the rollers 30.

The conveyors 22, 34 and 36 may be driven by any suitable means, the conveyors 22 as by a motor 45 which has driving connection, through a worm 46 and a worm wheel 47, with a roller 48, over which the conveyor is trained.

When it is desired to unload the vessel, the conveyors are set in operation. Pairs of opposed doors 18 in both tunnels 10 are then opened by means of the mechanisms 20 thereby to permit the discharge of cargo material from one of the compartments 5 onto the lower flights of the conveyors 22. The material is carried by said flights forwardly and is discharged through the hoppers 31 on the belt 34 which transports the material to the boom conveyor 37 that has been adjusted with its outer end in discharging relation to a suitable cargo receiver. Thus a continuous stream of material flows from the cargo compartment that is being unloaded through the tunnels and over the conveyors 34 and 37. The doors 18 may be adjusted to permit the discharge of as great a quantity of material as the conveyors will accommodate; and as one compartment, or one portion of a compartment, is emptied, other doors 18 are opened to sustain uninterrupted the supply of material to the conveyors until the entire vessel, or that part of it which it is desired to unload, is emptied.

With a view of keeping the vessel properly "trimmed", the various doors 18 may be opened in any selected order to effect this end.

Having thus described our invention, what we claim is:—

1. In combination with a cargo vessel, an endless apron conveyor arranged with its lower flight adjacent the bottom of the vessel, a tunnel enclosing both flights of the conveyor and having an opening in its side, a cargo supporting floor inclined downwardly toward the tunnel and arranged to discharge cargo material through said opening onto the lower flight of the conveyor, and means for driving the conveyor.

2. In combination with a cargo vessel, an endless apron conveyor arranged with its lower flight adjacent the bottom of the vessel, a tunnel enclosing both flights of the conveyor and having an opening in its side, a cargo supporting floor inclined downwardly toward the tunnel and arranged to discharge cargo material through said opening onto the lower flight of the conveyor, means for controlling the flow of material through said opening, and means for driving the conveyor.

3. In combination with a cargo vessel, an endless apron conveyor arranged with its lower flight adjacent the bottom of the vessel, a tunnel enclosing both flights of the conveyor and having an opening in its side, a cargo supporting floor inclined downwardly toward the tunnel and having its discharge end extended through said opening and overlying the edge of the lower flight of the conveyor, and means for driving the conveyor.

4. In combination with a cargo vessel, an endless apron conveyor arranged with its lower flight adjacent the bottom of the vessel, a tunnel enclosing both flights of the conveyor and having an opening in its side, a cargo supporting floor inclined downwardly toward the tunnel and having its discharge end extended through said opening and overlying the edge of the lower flight of the conveyor, means for controlling the flow of material through said opening, and means for driving the conveyor.

5. In combination with a cargo vessel, an endless apron conveyor arranged with its load carrying flight immediately adjacent the bottom of the vessel, a cargo supporting floor inclined downwardly toward the same so as to discharge material supported thereby onto said flight, a roof structure cooperating with said cargo supporting floor for restraining the bulk of the material from descending upon the flight, the upper flight of the conveyor being arranged below said roof structure, and means for driving the conveyor.

6. In combination with a cargo vessel, an endless conveyor arranged with its load carrying flight immediately adjacent the bottom of the vessel, cargo supporting floors arranged on opposite sides of the conveyor and inclined downwardly toward the same so as to discharge material supported thereby onto said flight of the conveyor, a roof structure cooperating with said cargo supporting floors for restraining the bulk of the material from descending upon the flight, the upper flight of the conveyor being arranged below said roof structure, and means for driving the conveyor.

7. In combination with a cargo vessel, tunnels within and spaced apart transversely of the hold of the vessel and extending longitudinally thereof, said tunnels having openings in their sides, endless apron conveyors housed within said tunnels and having their lower flights adjacent the bottoms thereof, cargo supporting floors on opposite sides of the tunnels and inclined downwardly toward the openings in the side walls thereof so as to discharge cargo material through said openings onto the lower flights of the conveyors, doors for the aforesaid openings, and means for driving the conveyors.

8. In combination with a cargo vessel, tunnels within and spaced apart transversely of the hold of the vessel and extending longitudinally thereof, said tunnels having openings in their sides, endless apron conveyors housed within said tunnels and having their lower flights adjacent the bottoms of the respective tunnels, inclined cargo supporting floors on opposite sides of said conveyors having their lower ends extended through the aforesaid openings in a position to discharge material upon the lower flights of the conveyors, doors for said openings, means for holding said doors in various adjusted positions, and means for driving the conveyors.

9. In combination with a cargo vessel, tunnels within and spaced apart transversely of the hold of the vessel and extending longitudinally thereof, endless apron conveyors housed within said tunnels, supports situated adjacent the bottoms of the respective tunnels for supporting the lower flights of the conveyors and imparting thereto a troughlike formation, the tunnels having openings in their sides, inclined cargo supporting floors on opposite sides of the tunnels and having their lower ends projected through said openings and disposed in proximity to the edges of the lower flight of the conveyor, doors for said openings, means for holding the doors in various adjusted positions, and means for driving the conveyors.

10. In combination with a cargo vessel, tunnels within and spaced apart transversely of the hold of the vessel and extending longitudinally thereof, said tunnels having openings in their sides, endless apron conveyors housed within said tunnels and having their lower flights adjacent the bottoms of the tunnels, inclined cargo supporting floors on opposite sides of the tunnels and having their lower ends arranged to discharge material through said openings onto the lower flights of the conveyors, guides adjacent one end of each of the conveyors over which its lower flight is given a downward return bend, a hopper in receiving relation to the return bend portion of each of the conveyors, the hoppers having discharge spouts directed toward each other, an endless apron conveyor in receiving relation to said spouts for conveying the material from the hold of the vessel, and means for driving said conveyors.

In testimony whereof, we hereunto affix our signatures.

ALBERT E. R. SCHNEIDER.
FRANK D. BURKE.